United States Patent [19]

Kusiak

[11] Patent Number: 4,753,572

[45] Date of Patent: Jun. 28, 1988

[54] PROPELLER PITCH CHANGE ACTUATION SYSTEM

[75] Inventor: Edward H. Kusiak, Longmeadow, Mass.

[73] Assignee: United Technologies Corporation, Hartford, Conn.

[21] Appl. No.: 914,705

[22] Filed: Oct. 2, 1986

[51] Int. Cl.[4] .............................................. B64C 11/38
[52] U.S. Cl. ...................................... 416/46; 416/153; 416/165; 416/157 R; 416/160
[58] Field of Search ................... 416/46, 48, 153, 154, 416/155–157 R, 157 A, 165, 160, 151, 152

[56] References Cited

U.S. PATENT DOCUMENTS

| | | | |
|---|---|---|---|
| Re. 26,461 | 9/1968 | Barnes et al. | 170/160.32 |
| 2,164,489 | 7/1939 | Berliner | 416/46 |
| 2,274,334 | 2/1942 | Keller | 416/154 |
| 2,855,057 | 6/1956 | Van Alstyne . | |
| 2,856,012 | 10/1958 | Frankland . | |
| 2,940,527 | 10/1957 | Van Alstyne et al. . | |
| 2,969,685 | 1/1961 | Hirsch et al. | 416/48 X |
| 2,985,244 | 11/1957 | Fischer et al. . | |
| 3,090,445 | 12/1960 | Fischer . | |
| 3,187,819 | 4/1963 | Barnes et al. . | |
| 3,439,745 | 4/1969 | Gaubis et al. . | |
| 3,484,176 | 12/1969 | Quenneville | 416/156 |
| 3,722,641 | 3/1973 | Kusiak | 192/8 |
| 3,766,798 | 10/1973 | Kusiak | 74/424.8 |
| 3,802,799 | 4/1974 | McMurtry | 416/157 A |
| 3,895,884 | 7/1975 | Andrews | 416/153 |
| 3,900,274 | 8/1975 | Johnston et al. | 416/155 |
| 3,902,822 | 9/1975 | Andrews et al. | 416/170 |
| 3,994,128 | 11/1976 | Griswold et al. | 416/160 X |
| 4,047,842 | 9/1977 | Avena et al. | 416/160 X |
| 4,523,891 | 6/1985 | Schwartz et al. | 416/157 |
| 4,591,313 | 5/1986 | Miyatake et al. | 416/155 |

FOREIGN PATENT DOCUMENTS

| | | |
|---|---|---|
| 584450 | 1/1947 | United Kingdom ................ 416/46 |
| 1174345 | 12/1969 | United Kingdom . |
| 1174345 | 12/1969 | United Kingdom . |
| 1484685 | 9/1977 | United Kingdom . |
| 1454232 | 11/1976 | United Kingdom . |
| 1484685 | 9/1977 | United Kingdom . |

OTHER PUBLICATIONS

Examiner's Report to the Comptroller, Nov. 23, 1987.
Examiner's Report to the Comptroller, Nov. 23, 1987.

*Primary Examiner*—Everette A. Powell, Jr.
*Attorney, Agent, or Firm*—Lloyd D. Doigan

[57] ABSTRACT

A mechanical pitch lock includes a pitch lock screw (60) that simultaneously rotates within an actuator (42) while the actuator moves to change the pitch of a propeller blade (16). While rotating simultaneously with the motion of the pitch actuator, the pitch lock screw maintains a longitudinal position allowing the actuator to move. If the pitch lock screw does not rotate simultaneously with the actuator, the pitch lock screw moves longitudinally with the actuator until it abuts a projection 66 thereby preventing further movement by the actuator.

5 Claims, 3 Drawing Sheets

PROPELLER PITCH CHANGE ACTUATION SYSTEM

DESCRIPTION

TECHNICAL FIELD

This invention relates generally to aircraft propeller systems and more particularly to variable pitch propeller systems.

BACKGROUND ART

Typically, variable pitch aircraft propeller systems include: a plurality of propeller blades extending radially from a central hub, an engine for rotating the hub and propeller blades, and a pitch actuating system that pivots the propeller blades about their longitudinal axes to vary the angle (pitch) of the blades with respect to the approaching air flow. The hub has an interior chamber which houses the pitch actuating system.

Pitch actuation systems generally include a pitch lock. In the event of a malfunction of the pitch actuation system, the pitch lock prevents overspeed of the engine by preventing the blade from retarding to a lower pitch.

One type of pitch lock is hydromechanically controlled. A pressurized fluid holds the pitch lock, which is spring-loaded, out of locking engagement. Upon a determination that the propeller blade is undesirably moving toward a lower pitch, the pressurized fluid is bled away allowing the spring to urge the pitch lock into engagement with stationary pitch lock teeth thereby locking the movement of the blade. Examples of this type of pitch lock include U.S. Pat. Nos. 2,940,527 to H. L. Van Alstyne, et al. entitled "PROPELLER PITCH LOCK DISABLING AND FEATHER LOCK MECHANISM"; 2,985,244 to Fischer, et al. entitled "PROPELLER BLADE PITCH LOCK CONTROL MEANS"; 3,187,819 to Barnes, et al. entitled "COMBINED PITCH LOCK AND FEATHER LATCH", and 3,439,745 to Gaubis, et al. entitled "COMBINED PROPELLER PITCH LOCK AND LOW PITCH STOP SYSTEM".

Some pitch locks form part of an hydraulic actuator. For instance, U.S. Pat. Nos. Re. 26,461 to Barnes, et al. entitled "PITCH CONTROL SYSTEM", and 4,523,891 to Schwartz, et al. entitled "PROPELLER PITCH CHANGE ACTUATION SYSTEM", show a screw attaching to an hydraulic actuator that prevents the propeller blade from moving to low pitch.

Some purely mechanical (as opposed to hydraulic) pitch actuators utilize fully mechanical pitch locks. For instance, U.S. Pat. Nos. 2,856,012 to Frankland entitled "MECHANICAL PITCH LOCK", and 3,895,884 to Andrews entitled "TORQUE SENSITIVE PITCH LOCK" each show a splined ring having teeth that force an engaging ring into a stationary lock ring when a propeller blade is undesirably moving toward a lower pitch.

Other means and apparatus are sought to prevent a propeller blade from changing its pitch to prevent overspeed conditions. It is to that end that this invention is directed.

DISCLOSURE OF INVENTION

According to the invention, a mechanical pitch change actuator is provided with a pitch lock that rotates simultaneously with the motion of the actuator to allow the actuator to set propeller blade pitch, but locks the propeller blade positionally when not rotating simultaneously with the actuator.

According to one embodiment of the invention, a first motor drives the actuator, a second motor drives the pitch lock and a synchronizer coordinates the first and second motors so that the pitch lock moves simultaneously with the actuator.

The pitch lock maintains a longitudinal position within the hub while rotating simultaneously with the longitudinal motion of the actuator, but moves longitudinally with the actuator if not rotating simultaneously therewith. In the locking position, the pitch lock abuts a projection thereby preventing further motion by the actuator locking the pitch of the propeller blade. The pitch lock is advantageously placed on the actuator in close proximity to the propeller blade such that damage to components farther from the propeller blade should not affect the operation of the pitch lock.

Other features and advantages of the present invention will be apparent from the specification and claims and from the accompanying drawings which illustrate an embodiment of the invention.

BEST MODE FOR CARRYING OUT THE INVENTION

Figure 1:
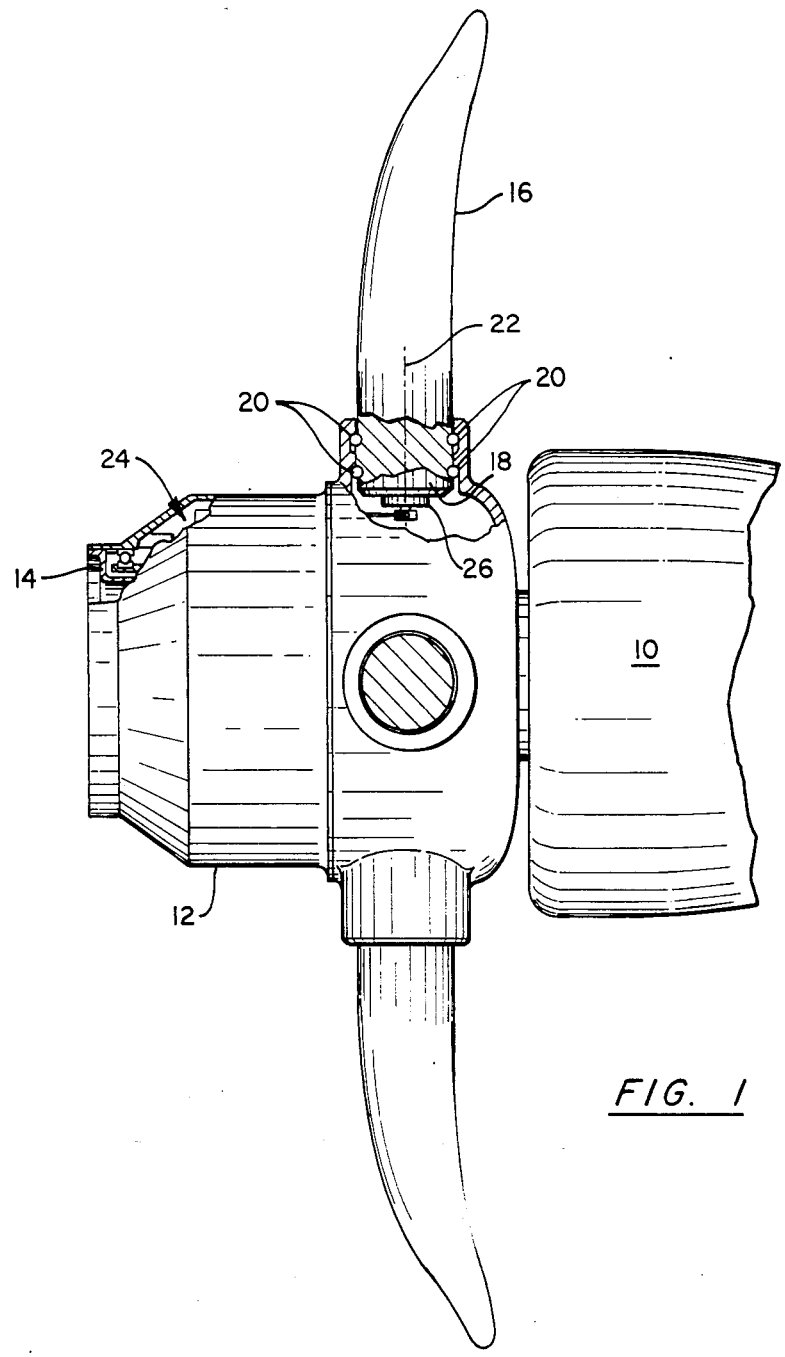
FIG. 1 is a partial cross-sectional view of an aircraft propulsion system employing the pitch lock of the present invention.

An aircraft propulsion system employing the concepts of the present invention is illustrated in FIG. 1. An engine 10 rotates a hub 12 via shaft 14. A plurality of radially extending propeller blades (hereinafter blades) 16 are mounted within the hub for rotation therewith. Each blade is mounted at a root portion 18 by bearings 20 which allow the blade to pivot about a longitudinal axis 22. A pitch actuator system shown generally at 24 attaches to the root end 26 of the blade to pivot the blade thereby setting the blade pitch, as will be discussed infra.

Figure 2:
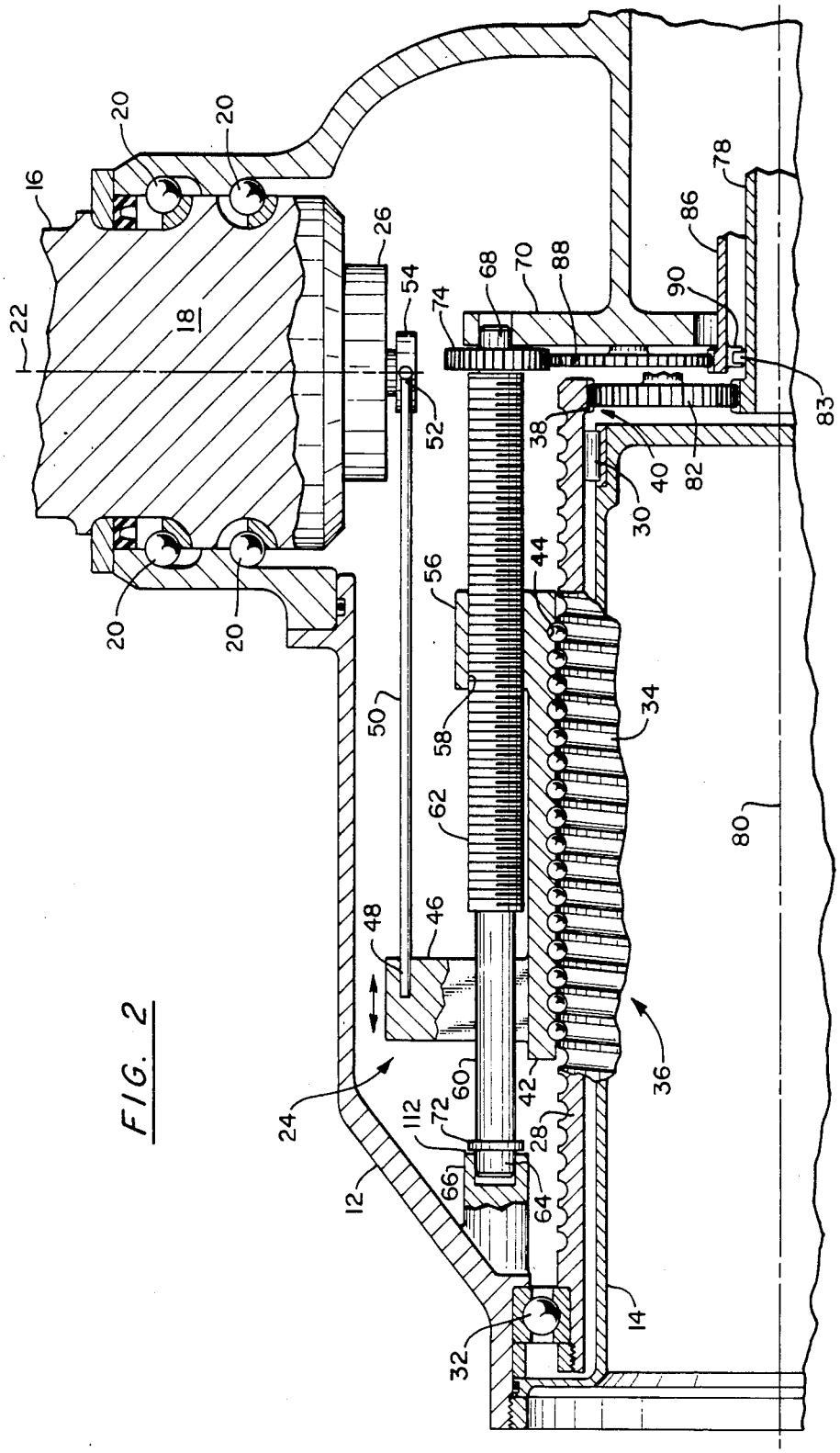
FIG. 2 is a partial cross-sectional view of a propeller hub as shown in FIG. 1.

Referring to FIG. 2, the details of the pitch actuator system are shown. A ball screw 28 is mounted within the hub for rotational movement relative to the shaft 14 and the hub 12. A roller bearing 30 is mounted between the shaft and the ball screw, and a ball bearing 32 is mounted between the ball screw and the hub so that the ball screw is able to rotate relative to the shaft and the hub. The ball screw has a helical race 34 to accommodate balls 36, as will be discussed infra. A toothed surface 38 extends radially inwardly at an inboard end portion 40 of the ball screw, as will be discussed infra.

A ball nut 42 has a helical race 44 matching the helical race 34 in the ball screw 28. Rotation of the ball screw translates the ball nut longitudinaly. The balls roll in the helical races 44, 34 at half the speed of the races and exit at a trailing end of the ball nut. A return tube (not shown) in the ball nut picks up the balls at the trailing end of the ball nut and recirculates them into a leading end, thereby keeping a train of balls within the races for continuous operation. The ball nut has a first radial projection 46 that holds one end 48 of a connecting rod 50. The second end 52 of the connecting rod attaches to the eccentric pin 54 mounted to the root end 26 of the blade 16. A second radial projection 56 on the ball nut having a threaded, rectangular, cross-sectional portion 58 oriented parallel to the ball screw, acts as a pitch lock, as will be described infra.

A pitch lock screw 60 has an exterior, threaded portion 62 for rotation within the threaded portion 58 of the second radial projection 56. The pitch lock screw is rotatably mounted by an outboard end portion 64 within a hub projection 66 and by an inboard end portion 68 within a bulkhead 70. A shoulder 72 mounted closely to the outboard end portion of the pitch lock screw limits the pitch lock screw from moving longitudinally outboardly (i.e. toward low pitch). A gear 74 is fixedly mounted upon the pitch lock screw between the pitch lock screw thread portion and the mounting bulkhead, as will be described infra.

Figure 3:
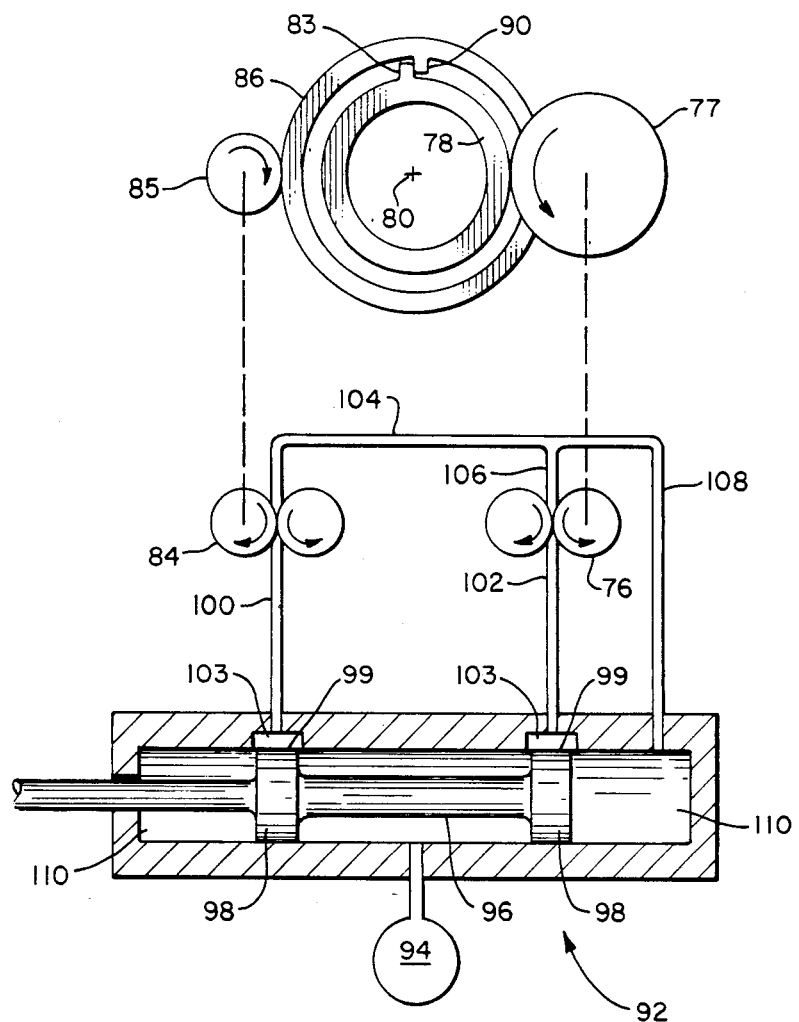
FIG. 3 is a schematic view of the driving system of the pitch lock as shown in FIG. 2.

A first hydraulic motor 76 (shown schematically in FIG. 3) for driving the ball screw 28 drives a first gear 78 mounted about a central axis 80 of the shaft 14 via differential gearing 77 (shown schematically in FIG. 3). The differential gearing 77 transfers the drive force of the first hydraulic motor 76, which is stationarily mounted, to the first gear 78, which is mounted for rotation relative to and with the hub. The first gear drives a first idler gear 82 which contacts the interior toothed surface 38 of the ball screw to transmit a rotational drive force of the first hydraulic motor to the ball screw. The first gear has an outwardly projecting first lug 83 on an exterior surface thereof for which purpose will be discussed infra. A second hydraulic motor 84 (shown schematically in FIG. 3) for driving the pitch lock screw 60 drives a second gear 86 mounted circumferentially about the first gear via differential gearing 85 (shown schematically in FIG. 3). The differential gearing transfers the drive force of the second hydraulic motor, which is stationarily mounted, to the second gear which is mounted for rotation relative to and with the hub. The drive force of the second hydraulic motor is transmitted to the pitch lock screw via the second gear, a second idler gear 88 and the gear mounted 74 on the inboard end of the pitch lock screw. The second gear has a second lug 90 projecting inwardly from an interior surface thereof for cooperating with the first lug projecting from the first gear, as will be discussed infra.

Referring to FIG. 3, a schematic depiction of the hydraulic drive system is shown. A control valve 92 directs a supply 94 of pressurized hydraulic fluid to one of two hydraulic motors 76, 84, as described above, to drive the blade towards high or low pitch. A spool 96 within the control valve and having lands 98, each land having an exterior surface 99, directs fluid to either hydraulic motor through line 100 or line 102. Lines 100 and 102 each have an inlet 103 which is slightly larger in area than the exterior surface 99 of the lands. Because the inlets are larger than the lands, fluid leaks to preload the hydraulic motors so that the lugs 83, 90 are in contact to be driven synchronously. After passing through either hydraulic motor, the fluid is directed via lines 104 and 106 to a reservoir 110 via line 108.

In operation, a signal to adjust blade pitch is directed to the valve 92. For instance, if it is desired to move the blade toward high pitch, the spool 96 is directed to the right as shown in FIG. 3. Hydraulic fluid is directed to the first hydraulic motor 76 which rotates the first gear 78 via the differential gear train 77. The first gear rotates the first idler gear 82 which rotates the ball screw 28. As a result of the rotation of the ball screw, the ball nut moves longitudinally inboardly. As the ball nut moves longitudinally inboardly, the blade 16 is rotated towards high pitch via the first radial projection 46, the connecting rod 50 and the eccentric pin 54.

While the first gear is being driven the first lug 83 engages the second lug 90 depending from the second gear 86 to synchronously drive the second gear with the first gear. The second gear rotates the pitch lock screw 60 via the second idler 88 and the gear 74. The first gear and idler and the second gear and idler are sized and synchronized so that the pitch lock screw rotates at the proper speed within the second radial projection 56 to maintain the pitch lock screw positionally as the ball nut moves longitudinally. If the pitch lock screw does not rotate at the proper speed in relation to the movement of the ball nut, the pitch lock screw will move longitudinally in the low pitch direction with the ball nut until the shoulder 72 abuts the hub projection 66. Friction between the teeth of the second radial projection 56 and pitch lock screw threaded portion 58 then prevents the ball nut from further longitudinal movement.

Should a malfunction occur such that the blade begins to extract power from the airstream rather than absorb engine power, the power from the airstream tends to twist the blade towards low pitch. As the blade 16 moves toward low pitch, the ball screw 28 is induced to move through its connection to the blade by the connecting rod 50 and the eccentric pin 54. However, since the pitch lock screw 60 is not rotating simultaneously with the motion of the ball screw, the pitch lock screw and ball nut 42 move longitudinally in the outboard direction until the shoulder 72 on the outboard end portion of the pitch lock screw abuts the hub projection 66. When the shoulder abuts the hub projection, the ball nut is prevented from further longitudinal motion, thereby locking the propeller from moving further towards low pitch. Since the distance between the shoulder and the hub projection (i.e. the "pitch gap" 112) is small, the propeller will not move any appreciable amount toward low pitch. It should be noted that due to the close tolerance between the bulkhead 70 and the gear 74 driving the pitch lock screw, the blade is also prevented from moving towards high pitch by the pitch lock screw. The blade might be forced towards high pitch if it absorbs energy from debris or other sources.

It should be understood that the invention is not limited to the particular embodiments shown and described herein, but that various changes and modifications may be made without departing from the spirit and scope of the invention as defined by the following claims.

Having thus described the invention, what is claimed:
1. An apparatus for adjusting the pitch of a variable pitch propeller blade characterized by:
   an actuator for setting the pitch of said propeller blade said actuator having;
   a rotatable screw for setting propeller pitch, a nut mounted for longitudinal motion along said screw as said screw is rotated,
   means for connecting said nut to said propeller blade to adjust the pitch of the propeller blade as said screw rotates, and
   a rotatable means mounted within said nut for locking the nut against longitudinal motion if the rotatable means is not rotating with the longitudinal motion of the nut and for allowing the nut to move longitudinally if the rotatable means is rotating with the longitudinal motion of the nut.

2. The apparatus of claim 1 further characterized by:
first means for driving said rotatable screw;
second means for driving said rotatable means; and
means for synchronizing said first and second means such that when either of said first means or said second means is driven, the other of said first or second means is also driven thereby ensuring that the rotatable means rotates simultaneously with the longitudinal motion of the nut.

3. The apparatus of claim 1 wherein said rotatable means is characterized by:
a lock screw means rotatably mounted within said nut, for maintaining a longitudinal position while rotating simultaneously with the longitudinal motion of the nut, and for moving longitudinally while not rotating simultaneously with said nut; and
an abutment means for limiting said longitudinal motion of said lock screw means while said lock screw means is not rotating simultaneously with said nut.

4. The apparatus of claim 3 further characterized by:
first means for driving said rotatable screw;
second means for driving said rotatable means; and
means for synchronizing said first and second means such that when either of said first means or said second means is driven, the other of said first or second means is also driven thereby ensuring that the rotatable means rotates simultaneously with the longitudinal motion of the nut.

5. The apparatus of claim 2 wherein said rotatable means is characterized by:
a lock screw means rotatably mounted within said nut, for maintaining a longitudinal position while rotating simultaneously with the longitudinal motion of the nut, and for moving longitudinally while not rotating simultaneously with said nut; and
an abutment means for limiting said longitudinal motion of said lock screw means while said lock screw means is not rotating simultaneously with said nut.

* * * * *